United States Patent
Nichols et al.

(10) Patent No.: US 9,043,270 B2
(45) Date of Patent: *May 26, 2015

(54) PROGRAMMING CONTENT ON A DEVICE

(71) Applicant: Dell Products, L.P., Round Rock, TX (US)

(72) Inventors: Timothy C. Nichols, Los Altos, CA (US); Mark Andrew Ross, San Carlos, CA (US); Clare Lawson, Los Altos, CA (US); Arthur Anthonie van Hoff, Menlo Park, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/478,933

(22) Filed: Sep. 5, 2014

(65) Prior Publication Data
US 2014/0379759 A1 Dec. 25, 2014

Related U.S. Application Data (63) Continuation of application No. 11/355,817, filed on Feb. 16, 2006, now Pat. No. 8,868,547.

(51) Int. Cl.
*G06F 17/30* (2006.01)
*H04H 20/40* (2008.01)
*H04H 60/46* (2008.01)
*H04H 60/65* (2008.01)

(52) U.S. Cl.
CPC .... *G06F 17/30743* (2013.01); *G06F 17/30017* (2013.01); *G06F 17/30749* (2013.01); *G06F 17/30752* (2013.01); *G06F 17/30761* (2013.01); *G06F 17/30772* (2013.01); *H04H 20/40* (2013.01); *H04H 60/46* (2013.01); *H04H 60/65* (2013.01)

(58) Field of Classification Search
CPC .................................................. G06F 17/3074
See application file for complete search history.

(56) References Cited

U.S. PATENT DOCUMENTS

| | | | |
|---|---|---|---|
| 6,202,058 B1 | 3/2001 | Rose et al. | |
| 7,343,141 B2 | 3/2008 | Ellis et al. | |
| 7,409,205 B2 | 8/2008 | Mittal | |
| 7,539,478 B2 | 5/2009 | Herley et al. | |
| 7,555,539 B1 | 6/2009 | Rosenberg et al. | |
| 7,590,993 B1 | 9/2009 | Hendricks et al. | |
| 7,783,249 B2 | 8/2010 | Robinson | |
| 7,853,600 B2 | 12/2010 | Herz et al. | |
| 8,230,343 B2 | 7/2012 | Logan et al. | |
| 2002/0023142 A1* | 2/2002 | Michaelis et al. | 709/217 |
| 2002/0069218 A1 | 6/2002 | Sull et al. | |
| 2003/0014767 A1* | 1/2003 | Stumphauzer, II | 725/131 |
| 2003/0093790 A1 | 5/2003 | Logan et al. | |

(Continued)

*Primary Examiner* — Sherief Badawi
*Assistant Examiner* — Sabana s Rahman
(74) *Attorney, Agent, or Firm* — Brian Tucker; Kirton McConkie (57) ABSTRACT

Discovering content on a device. Content stored on a device can be examined or searched based on the programming of channels that are available to the device. The content can be searched using other rules related to user preferences. Based on the results of the examination of the content, playlists are generated. Each playlist includes content from the device that matches or partially matches the content associated with one of the channels. Using the playlists, a user can load content from their device that has a theme consistent with a particular channel. The playlists can also be used to tune to the channels associated with the playlists and thereby discover the content on those channels.

16 Claims, 3 Drawing Sheets

(56) References Cited

U.S. PATENT DOCUMENTS

| | | |
|---|---|---|
| 2003/0135857 A1 | 7/2003 | Pendakur et al. |
| 2004/0141476 A1* | 7/2004 | Chumbley et al. ............ 370/326 |
| 2004/0268413 A1 | 12/2004 | Reid et al. |
| 2005/0020223 A1 | 1/2005 | Ellis et al. |
| 2005/0108754 A1 | 5/2005 | Carhart et al. |
| 2005/0210501 A1 | 9/2005 | Zigmond et al. |
| 2006/0140107 A1 | 6/2006 | Kanegae et al. |
| 2006/0206478 A1 | 9/2006 | Glaser et al. |
| 2006/0212442 A1* | 9/2006 | Conrad et al. .................... 707/5 |
| 2006/0253782 A1 | 11/2006 | Stark et al. |
| 2006/0276174 A1 | 12/2006 | Katz et al. |
| 2007/0053513 A1 | 3/2007 | Hoffberg |
| 2007/0055398 A1* | 3/2007 | Steinberg ........................ 700/94 |
| 2007/0089151 A1 | 4/2007 | Moore et al. |
| 2007/0143816 A1 | 6/2007 | Gupta et al. |
| 2007/0174147 A1 | 7/2007 | Klein |

* cited by examiner

PROGRAMMING CONTENT ON A DEVICE

CROSS-REFERENCE TO RELATED APPLICATIONS

This application is a continuation of U.S. patent application Ser. No. 11/355,817 which was filed on Feb. 16, 2006.

BACKGROUND

1. The Field of the Invention

The present invention relates to discovering content with a device. More particularly, embodiments of the invention relate to systems and methods to programming content on a device.

2. The Relevant Technology

In today's world, digital media has become a common source of news and entertainment and the digital media can be delivered in a variety of different ways and locations. Radio stations, for example, broadcast over the open air to certain markets as well as over satellite networks and computer networks. Television programming can be received over cable and satellite networks. Performances, sporting events and talk shows can be attended, watched live, or recorded for later viewing. The ability to experience the content of these different types of programming has become an everyday occurrence for many people.

Not surprisingly, different people often prefer to experience different types of content. Some persons, for example, may enjoy listening exclusively to talk radio, while other persons may desire to listen to classical music or watch the latest movies. This aspect of people's personalities has led content providers, at least in part, to develop specialized or themed channels where the content on a particular channel fits within a defined space or genre. Some radio stations, for example, are dedicated to talk shows while other stations play only a particular type of music. In each case, the content provided by a given content provider is often directed to a specific target audience or demographic.

In satellite radio, multiple channels can be delivered to subscribers over the satellite network and the ability to provide themed channels is also evident in satellite radio. Many of the channels on satellite radio have a particular theme or provide only a particular type of content. There are channels, for example, that are dedicated to certain music genres as well as stations that focus on sports programming or talk radio.

The content on each of these channels is programmed by a content provider. One attractive feature of programmed content on a given channel is that the user can expect to receive a certain type of content or receive content that presumably fits within the content requirements of the channel. Because the content provider typically has more source content than the typical subscriber, another attractive feature of programmed content is that the users receiving the programmed content may experience content that they might not have experienced otherwise. In addition, the subscriber may experience content in an unexpected order.

While users often enjoy listening to satellite radio, they also enjoy listening to content that may be stored on their device. The difficulty faced by these users, however, is in creating playlists that have different themes. Conventional devices, for example, typically provide only two modes of playback: (i) in order and (ii) random. The only option for generating a playlist that is not in order or random is to manually create the playlist. As many users know, the process of manually creating a playlist is cumbersome and may require the user to sort through a large library of content. In other words, successfully creating playlists that are themed or that are different from playing the stored content in order or randomly requires manual playlist creation.

BRIEF SUMMARY

These and other limitations are overcome by embodiments of the present invention, which relates to systems and methods for discovering content and more particularly to discovering content based in part on the programming or content included in channels available to a device. The device can examine its stored content using rules that are based on the content of the channels available to the device. Using these rules, playlists can be generated such that each playlist identifies content that is associated with a particular channel. The user can select one of the generated playlists and then experience content stored on the user's device that is consistent with the content of the channel associated with the play list.

In one example, a method for discovering content may being by examining content on a device using rules. The rules are usually associated with specific channels and describe the content of those channels. The rules may also take user preferences and other characteristics of the content into account. Then, playlists are generated based on the rules and the results are displayed on a display of the device. From the playlists, a user can select a playlist to be played, select the channel that is associated with the playlist, set device channel presets, and the like or any combination thereof.

In another example, discovering content on a device first searches the content of a device and/or content on a computer or other device associated with the user's device. The device includes a discovery module that applies rules to the content such that each portion (song, for example) of the content is associated with at least one channel. In other words, the discovery module can create a correlation matrix that indicates how well the content matches with the various channels available to the device. Playlists can then be generated based on the results of applying the rules or based on the correlation matrix. Each playlist corresponds with a particular channel and the content identified by the playlist matches or is consistent with the content of the associated channel.

Additional features of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

Embodiments of the invention relate to systems and methods for discovering content and more particularly to programming content on a device. Many users, for example, typically have a device that stores some of the user's content or includes other lists that identify content associated with the user. A user's device may also work in conjunction with another device such as a computer that stores additional content. Embodiments of the invention program the content on the device based on the content that may be provided from another source. In particular, the content on a device can be programmed in response to a style that corresponds to the content provided by a content provider.

For example, a satellite radio content provider typically provided themed channels and embodiments of the invention enable the device to suggest content from the device that is consistent with a particular theme or themes. Embodiments of the invention also enable a user to discover channels provided by a content provider that are consistent with the content stored on the user's device. In another example, a device provides stored content to a user when an external content source is blocked or temporarily unavailable. In this manner, the user's experience appears seamless or nearly seamless.

Figure 1:
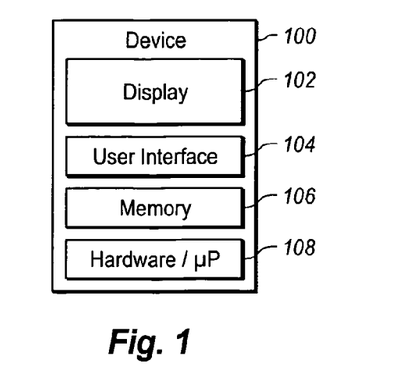
FIG. 1 illustrates an exemplary device for implementing embodiments of the invention.

FIG. 1 illustrates an exemplary device in accordance with the present invention. The device 100 is representative of both portable and non-portable devices that can receive, store, and/or play digital content. Examples of the device 100 include, but are not limited to, portable audio players (MP3 players), portable DVD or CD players, personal digital assistants, cellular telephones, computers, satellite radios, or any combination thereof.

The device 100 in FIG. 1 includes a display 102 and a user interface 104. The user interface 104 enables a user to interact with the device 100 and the display 102 provides visual information to a user of the device. The device 100 also includes memory 106 and hardware 108. The memory 106 can be volatile and/or non-volatile. The memory 100 may store data related to the operation of the device including an operating system and user preferences as well as store content. The content may include digital music, talk, and the like or any combination thereof. The hardware 108 includes the processor and/or other electronic components that facilitate the content stored in the memory 106 to be played, that enable the device 100 to receive content or that enable the device 100 to interact with other devices and networks. In some instances, the device 100 may have the capability to interact with other similar devices or to dock with a personal computer.

Figure 2:
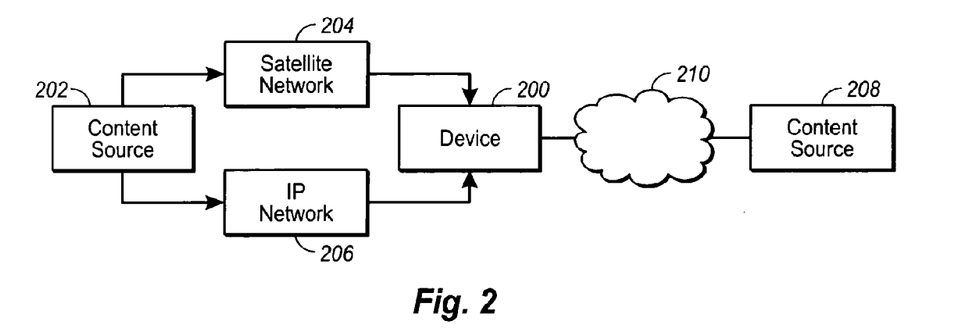
FIG. 2 shows an exemplary environment including networks used to deliver content to a device.

In one embodiment, the device 100 is a satellite radio, but one of skill in the art can appreciate that embodiments of the invention relate to other types of devices as well including those described above. As illustrated in FIG. 2, the device 200, which is one embodiment of the device 100, can receive content from a content source 202 over one or more networks. The device 200 receives content over the satellite network 204 and/or over an IP network 206. The content transmitted to the device 200 over the satellite network 204 may be similar or identical to the content transmitted over the IP network 206.

The IP network 206 is representative of other networks that may be accessible to the device 200. By way of example, Bluetooth networks, WiFi networks, cellular networks, and other wireless networks may be accessible to the device 200 and are represented by the IP network 206. The device 200 may also have access to the Internet or a LAN when docked with a computer or using a wireless connection. For example, the device 200 may have the capability to access other content providers or servers 208 over the network 210. The network 210 may be the Internet, for example, and may be the same as the IP network 206.

Figure 3:
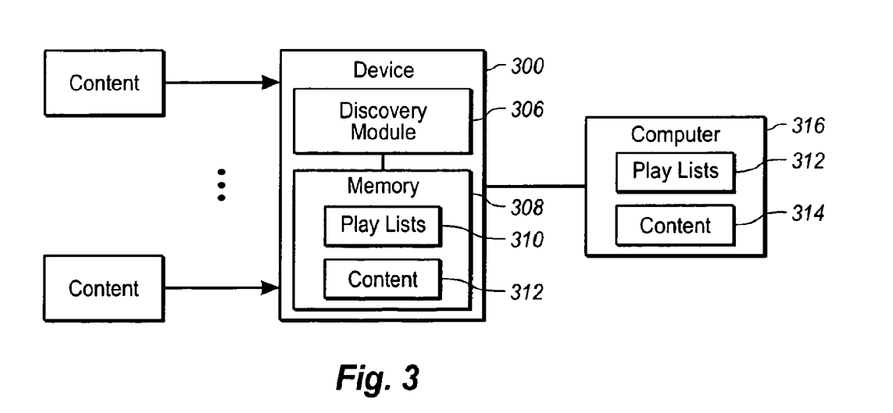
FIG. 3 illustrates a device's discovery module that is used to examine the content on the device and generate playlists based on programming received by the device.

FIG. 3 illustrates an example of a device that discovers content. The device 300, which is an embodiment of the device 100, receives at least one of the content 302 and the content 304. The content 302 and the content 304, in this example, are delivered over different networks as illustrated in FIG. 2, but may the same or different content. The device 300 also has access to content 310 and play lists 312, both of which are stored in the memory 308 of the device 300. Additional content 316 and playlists 314 may be stored on the computer 316 and accessible to the device when docked or over a network connection. In some instances, the content 310 is a subset of the content 312.

The device 300 of FIG. 3 also includes a discover module 306 that can interact with the content 302, 304, the content 310 stored on the device and the content 312 stored on the computer 316. The computer 316 may be a network of computers or a database stored remotely from the user. The discovery module 306 examines the content 310 and/or the content 312. The discovery module 306, after examining the content 310, can enable the user to experience channels that carry similar content.

Generally stated, the discovery module 306 can generate playlists 312 of the content 310 and/or 312 that are similar to or that are consistent with the channels received by the device from content providers. In another example, the discovery module 306 can examine the content and then recommend specific channels from the channels available to the device that are consistent to the content stored and/or accessible to the device 300.

Thus, the discovery module 306 generates playlists 312 from the content 310 that correspond to channels available in the content 302, 304. For example, if the content 302 includes a channel dedicated to jazz music, then the discovery module 306 may generate a playlist 312 from the content 310 (and/or the other content available to the device 300) that may be similar to or consistent with the channel dedicated to jazz music. In another embodiment, when the device loses the satellite signal, the device can begin playing the appropriate playlist that is consistent to the channel that was lost. When possible, the change to stored content will be seamless or nearly seamless from the perspective of the user, which enhances the user experience because the user does not experience any interruption. When the satellite signal is again available, the device can resume playing the content received over the satellite network.

Figure 4:
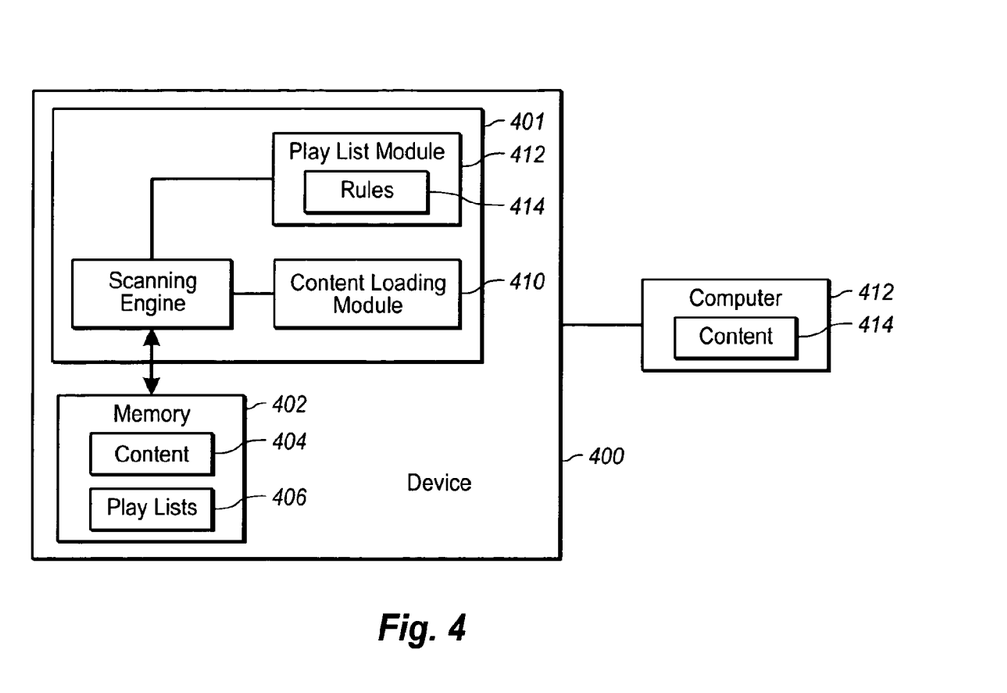
FIG. 4 illustrates another embodiment of the discovery module used to examine the device's content and generate playlists.

FIG. 4 illustrates a device 400, which is another embodiment of the device 100, which illustrates one embodiment of the discovery module shown in FIG. 3. The discovery module 401 includes a scanning engine 408, a playlist module 412, and a content loading module 410. The playlist module 412 may be based on programming associated with a content provider. The playlist module 412 can also be updated or modified at any time. For example, a satellite radio content provider may provide multiple channels of content. The playlist module 412 may be based on the programming style of the channels generated and transmitted by the content provider. This enables the playlist module 412 to identify the content that is similar to or consistent with the various channels provided by the content provider.

The programming style of the channels can be embodied as the rules 414. The rules 414 of the playlist module 414, for example, may identify artists that are associated with specific channels. Because a particular artist may be played on more than one channel, each artist may also have a score that indicates which channel is more likely for the specific artist. The rules 414 can also include information about genre, time periods describing when the content was created, and metadata describing the content, and the like or any combination thereof. The rules 414 can therefore include the information and other metadata that defines the type of content that corresponds with each particular channel.

The rules 414 may also take into account other information that may be specific to the device, although some of the same information may be received from an external source and be representative of a larger sample of users. Content ratings, for example, can be set by a user for the content on the device. However, the same content may also have ratings that are generated by another entity. In either case, these ratings can be considered by the rules 414 in generating the playlists 406. The rules 414 may also consider the content (such as songs) that has actually been played by the user as well as the number of times specific content has been played. The rules 414 can also be updated dynamically or otherwise changed by a service and/or by the user.

The playlist module 412 uses the scanning engine 408 to examine the content 404 stored in the memory 402. The playlist module 412 may also examine the content stored on another device 412 such as a desktop computer associated with the device 400. The content loading module 410 can then load content based on the playlists 406. In one embodiment, the playlist module 412 operates on the computer on the content 414. The playlists that are generated can then be transferred to the device 400.

Figure 5:
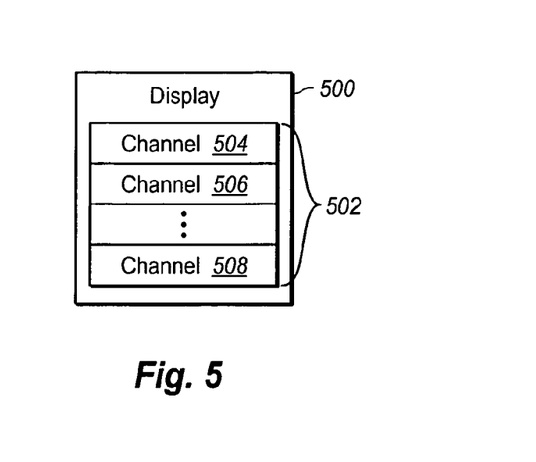
FIG. 5 illustrates one embodiment of the results that may be generated by an examination or search of the device's content.

The results of the examination of the content can be represented in various forms. FIG. 5 illustrates one example of the data returned by the scanning engine 408 or by the playlist module 412. The display 500 includes a set of channels 502. The channels 502 represent the channels, in this example, that best match or that are most consistent with the content stored on the device. The channel 504, for example, has the highest affinity with the content on the device and the channels 506 and 508 have less affinity. It may be the case that the set of channels 502 may be generated in response to content stored on the user's computer rather than content actually stored on the device. In this sense, the set of channels 502 still represents the user's content and in one embodiment, is representative of a broader scope of the user's content. The playlists generated in this manner represent another form of a channel.

When the user selects, for example, the channel 504, the device can tune to that particular channel and begin playing. In one example, the channels with the highest affinity to the user's stored content can be set as the user's channel presets. Alternatively, when the user selects the channel 504, a playlist is created using the specific content that matched or substantially matched the content associated with the channel 504 or the previously generated playlist associated with the selected channel may be played. With reference to FIG. 4, the content 404 that best satisfied the rules 414 for the channel 504 can be associated with a particular playlist. The number of entries in the playlist can be set by the user or set by default. Alternatively, the playlists associated with the channels 502 can be automatically generated. In one embodiment, the playlists 406 represent some of the channels available to the device 400. When used in another manner, the generated content can be examined to suggest channels to the user that have an affinity with the user's content.

In another embodiment, the scanning engine returns an intersection or a correlation matrix of the content 404 and the channels available to the device 400. The correlation matrix illustrates channels having one or more matches with the content 404 on the device 400. Channels that have no hits from the content can be eliminated from the user's view or only the top channels are presented to the user. The correlation matrix can be generated by scanning the content on the device. This may include an examination of the metadata of the content on the device. The metadata is then compared or analyzed in view of metadata associated with the channels or with the content on the channels available to the device. Music genre, artist, album name, and the like are examples of metadata that can be used in generating the correlation matrix.

The correlation matrix can be presented to the user in various forms. For example, a list of channels may be presented to the user illustrating the channels that have the highest affinity with the content on the device. Alternatively, the correlation matrix may present the content that has the highest affinity with a particular channel. The correlation matrix, in one embodiment, represents the relationship between the content stored on the device with the channels of content available to the device.

In one embodiment, the correlation matrix can identify the content that matches certain criteria. For example, the metadata of a channel may identify a list of artists, albums, genre, etc. If content on the device has metadata that matches the metadata of the channel, then the content matches or at least partially matches the channel. The content on the device can be effectively scored for each channel. Specific content may have an affinity with more than one channel. However, it may match one channel better than another. Nonetheless, that content can be associated with more than one channel in the correlation matrix.

In another example, each entry in the correlation matrix may define or describe a playlist. For example, the correlation matrix may return a list of channels such that the content is sorted by the list of channels. The content associated with a particular channel can be a playlist for that channel. The number of entries in the playlist can be set by default or by a user. Alternatively, a playlist can be randomly generated from the content that has an affinity with a particular channel.

The search or examination of the content 404 by the scanning engine 408 can be hierarchical in nature. The rules can be adapted such that the scanning engine 408 examines the content 404 in a hierarchical way. The search may first, for example, be based on artist. The results from the artist search can then be reexamined using music genre or time period or using any other attribute or characteristic. Playlists can then be generated according to the results of the search or examination of the content stored on the device or available to the device from another device.

The process of generating the playlists 416 can be a dynamic and adaptive process that accounts for changes to the content 404 on the device as well as in the content associated with the channels available to the device. User preferences, such as channel preferences, manually set presets, and other indications of the user's preferences can be incorporated into the rules 414. As a user rates content, the ratings can also be incorporated into the rules. The rules themselves can be updated as the content or channels change with time.

In addition, the user may make changes to the content that is stored on the device. By way of example and not limitation, the playlist module 412 may reexamine the content when the content changes, when the rules 414 change, and the like. As a result, the playlists 406 may be amended or replaced by the playlist module 412. The playlist module 412 may also add and/or delete playlists 406 over time.

Figure 6:
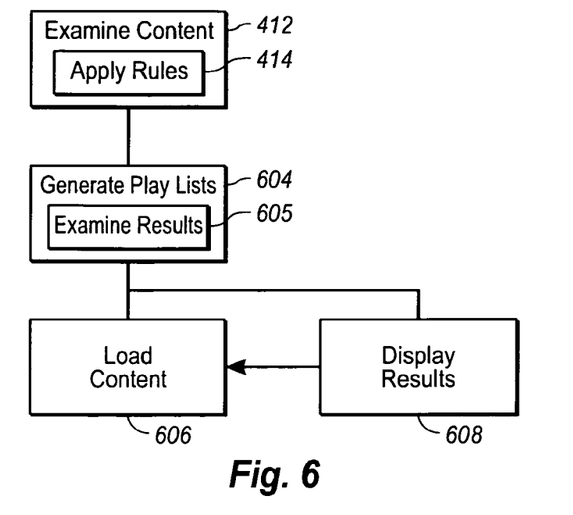
FIG. 6 illustrates an exemplary flow chart that depicts a method for discovering content on a device including generating playlists based on the rules that are related to the content of the channels available to the device.

FIG. 6 illustrates an exemplary method for discovering content. The content stored on a device is examined 602 or searched. This may include examining the content stored on other devices such as a computer with which the device docks. Examining the content 602 also includes applying rules 603 to the content. The rules can be created using a variety of sources. One source for the rules applied to the examination or search of the content is the provider of satellite radio content. These rules may be tailored to the channels delivered by satellite radio service. The rules may also be related to user preferences, content actually played by the user's device, user ratings, and the like or any combination thereof.

After the content has been examined 602, the playlists are generated 604. Generating the playlists 604 includes examining the results 605 from the application of the rules. The generated playlists may identify content that may conform with or be similar to the content that is on certain channels available to the device. The generation of the playlists may depend on how the content matches up with the channels as determined by the rules.

After the playlists are generated, results are displayed 608. As previously indicated, the results can take various forms. Typically, the results conveyed to the user on the display of the user's device include identifying the channels that have the highest affinity with the user's content. The results displayed to the user may also include a list of artists, genres, songs and an indication of how they match or are consistent with various channels. The results displayed to the user may include the generated playlists, which can then be selected and played. Alternatively, the results can indicate specific channels that have an affinity with the user's content. The user can then tune to one of the channels and discover the content on the selected channel.

After the playlists are generated 604 or after the results are displayed 608, the content may be loaded 606 according to one of the playlists or in response to a user selection of the displayed results. In one embodiment, a user may continue listening to one of the channels delivered to the device. Loading content 606 may also occur without user input, such as described below when a satellite signal is lost.

Figure 7:
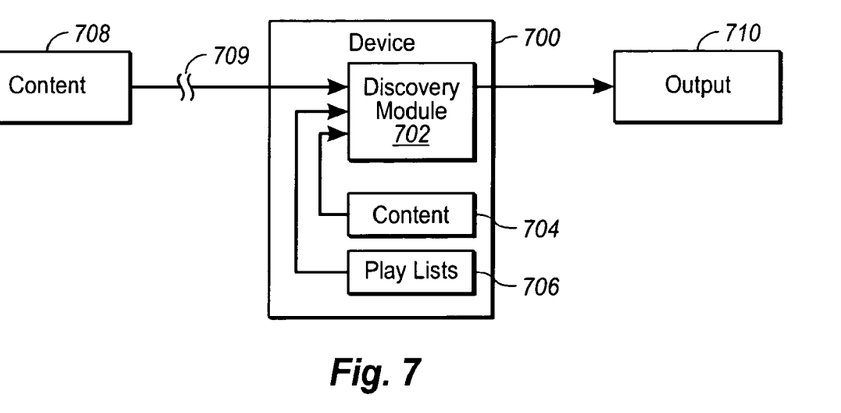
FIG. 7 illustrates one embodiment of a device that provides content when a loss of signal is detected such that the content delivered to the device is consistent to the content the user was experiencing when the loss of signal was experienced.

FIG. 7 illustrates a system where a device can ensure that the content experienced by a user is not interrupted or ensure that content interruptions are minimized. In this example, the delivery of the content 708 to the device 700 is interrupted 709 or missing. This can occur in the context of satellite radio signals, for example, when the signal to noise ratio drops below some threshold, or when the satellite signal is subject to interference or obstructed by bridges, power lines, etc. If the interruption of the satellite signal is sufficient, then the device conventionally experiences an interruption where no content is played.

In this example, the discovery module 702 of the device 700 can detect a loss of signal, or insufficient signal to noise ratio, or other threshold that indicates poor reception or loss of the satellite signal. In this case, the discovery module 702 can access the playlists 706 and begin to play content 704 from the memory of the device 700 as output 710.

As previously described, the playlists 706 generated by the discovery module 702 often correspond to at least some of the channels that are included in the content 708 or that are available to the device 700. When the user is playing the content on a particular channel and that channel is lost, the discovery module 700 can select the particular playlist that corresponds to the lost channel. In this manner, the user not only experiences minimal interruption, but the user also experiences content that is consistent with the lost channel. When the channel is again received by the device, the discovery module 702 transitions back to the channel.

Figure 8:
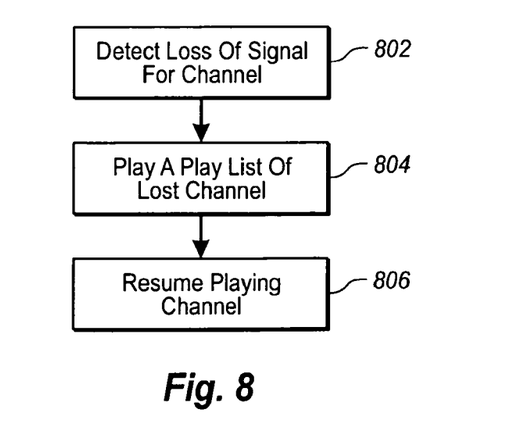
FIG. 8 is an exemplary flow diagram depicting a method for providing content to a user when loss of signal is detected.

FIG. 8 illustrates an exemplary method for providing content. In this example, a device that receives content over multiple channels from at least one network such as a satellite radio network. The device can monitor certain characteristics of the signal(s) delivering the channels. In one example, the device detects 802 loss of the signal for at least one channel. Detecting loss of the signal can include losing the channel, determining when the signal to noise ratio passes a certain threshold, and the like or other aspects or characteristics that suggest that the received signal is insufficient for the device.

When loss of signal is detected, the device plays 804 a playlist. The playlist selected and played by the device is, in one embodiment, similar in content to the channel that was playing when the loss of signal was detected. In this manner, the device experiences content that is similar. As previously indicated, the discovery module has examined the content on the device to identify the content that has affinity with the channels available to the device. Thus, each playlists may be associated with at least one channel. When a particular channel is lost, then the playlist(s) associated with that channel can be played.

In one embodiment, the device ensures that the transition from the satellite signal to the stored content is seamless. For example, the device may detect that a signal is losing strength, but may wait until the end of the song before switching to the playlist.

During this time, the device is monitoring the satellite channel such that it can determine when the signal is again satisfactory. At this point, the device resumes 806 playing the channel. As described above, the transition from the stored content back to the satellite channel is seamless when possible. In the alternative, the device may perform a transitional content such that there is no abrupt change experienced by the user.

Embodiments within the scope of the present invention also include computer-readable media for carrying or having computer-executable instructions or data structures stored thereon for performing embodiments of the invention. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method, performed by a device that both stores audio files and receives streamed audio content from a plurality of radio channels, of organizing the audio files stored on the device based on characteristics of the stored audio files when compared to characteristics of each of the plurality of radio channels, the method comprising:

analyzing content received over at least a first radio channel and a second radio channel of the plurality of radio channels to determine characteristics of the audio content that is streamed over the first and second radio channels;

based on the analysis, determining that the first radio channel plays a first type of music and that the second radio channel plays a second type of music;

creating a first playlist based on the first radio channel;

creating a second playlist based on the second radio channel;

for each of a plurality of audio files stored on the device, comparing the audio file to the first and second radio channels to determine whether the audio file comprises the first type of music played on the first radio channel or the second type of music played on the second radio channel;

based on the comparison, placing each audio file in the first or second playlist such that audio files comprising music of the first type are placed in the first playlist while audio files comprising music of the second type are placed in the second playlist;

determining that the plurality of audio files stored on the device has changed such that one or more additional audio files are stored on the device;

for each of the one or more additional audio files, comparing the audio file to the first and second radio channels to determine whether the audio file comprises the first type of music played on the first radio channel or the second type of music played on the second radio channel;

based on the comparison, placing the one or more additional audio files in either the first or second playlist; and displaying a listing of each playlist and its correlated channel.

2. The method as defined in claim 1, wherein analyzing content received over at least a first radio channel and a second radio channel of the plurality of radio channels to determine characteristics of the audio content that is streamed over the first and second radio channels comprises determining metadata of a plurality of songs that are regularly streamed on each channel.

3. The method of claim 1, further comprising:
indicating a degree to which the characteristics of at least some of the audio files within a particular playlist matches the characteristics of a particular channel.

4. The method of claim 1, wherein the plurality of audio files comprise a subset of all audio files stored on the device, and wherein the audio files in the subset have been played more than audio files on the device that are not included in the subset.

5. The method of claim 1, further comprising:
receiving input from the user that selects one of the channels of audio content; and
displaying to the user one or more playlists that include audio files whose metadata most closely matches the characteristics of the selected channel.

6. The method of claim 1, further comprising:
correlating the first playlist with the first radio channel; and
correlating the second playlist with the second radio channel.

7. The method as defined in claim 6, further comprising:
setting at least some channels to which one or more playlists correlate as a preset channel on the device.

8. The method of claim 6, further comprising:
receiving user input that selects the first playlist; and
tuning the device to the first radio channel.

9. The method as defined in claim 1, further comprising performing a subsequent analysis of the content received over at least some of the plurality of radio channels.

10. The method as defined in claim 9, wherein the subsequent analysis is performed when audio files stored on the device changes or audio content streamed on the one or more channels changes.

11. The method as defined in claim 1, wherein comparing the audio file to the first and second radio channels comprises comparing metadata of the audio files to the first and second radio channels, the metadata comprises at least one of an artist, a genre, or a time period of the audio files.

12. The method as defined in claim 11, wherein at least one type of metadata is given a greater weight in the comparison than at least one other type of metadata.

13. The method as defined in claim 1, further comprising loading the playlists on another device.

14. The method of claim 1, wherein determining that the plurality of audio files has changed comprises determining that the one or more additional audio files have been played more than a threshold number of times.

15. One or more non-transitory computer storage media storing computer executable instructions which when executed on a device that both stores audio files and receives streamed audio content from a plurality of radio channels implements a method of organizing the audio files stored on the device based on characteristics of the stored audio files when compared to characteristics of each of the plurality of radio channels, the method comprising:

analyzing content received over at least a first radio channel and a second radio channel of the plurality of radio channels to determine characteristics of the audio content that is streamed over the first and second radio channels;

based on the analysis, determining that the first radio channel plays a first type of music and that the second radio channel plays a second type of music;

creating a first playlist based on the first radio channel;

creating a second playlist based on the second radio channel;

for each of a plurality of audio files stored on the device, comparing the audio file to the first and second radio channels to determine whether the audio file comprises the first type of music played on the first radio channel or the second type of music played on the second radio channel;

based on the comparison, placing each audio file in the first or second playlist such that audio files comprising music of the first type are placed in the first playlist while audio files comprising music of the second type are placed in the second playlist;

determining that the plurality of audio files stored on the device has changed such that one or more additional audio files are stored on the device;

for each of the one or more additional audio files, comparing the audio file to the first and second radio channels to determine whether the audio file comprises the first type of music played on the first radio channel or the second type of music played on the second radio channel;

based on the comparison, placing the one or more additional audio files in either the first or second playlist; and displaying a listing of each playlist and its correlated channel.

16. The computer storage media of claim 15, further comprising:

receiving input from the user that selects the first radio channel;

displaying to the user the first playlist; and playing the first playlist in response to the input.

\* \* \* \* \*